United States Patent [19]

Koike et al.

[11] Patent Number: 5,605,210
[45] Date of Patent: Feb. 25, 1997

[54] TORQUE CONVERTER WITH A LOCKUP MECHANISM

[75] Inventors: Yasuhito Koike; Tatsuro Miyoshi; Masao Shoji, all of Fukuroi, Japan

[73] Assignee: NSK-Warner K.K., Tokyo, Japan

[21] Appl. No.: 363,338

[22] Filed: Dec. 23, 1994

[30] Foreign Application Priority Data

Dec. 24, 1993 [JP] Japan .................... 5-327549

[51] Int. Cl.$^6$ .................... F16D 33/00; F16D 13/64
[52] U.S. Cl. ............ 192/3.29; 192/3.33; 192/70.14; 192/107 R; 192/109 F
[58] Field of Search .................... 192/3.29, 3.3, 192/3.33, 109 F, 70.14, 107 R

[56] References Cited

U.S. PATENT DOCUMENTS

| | | | |
|---|---|---|---|
| 4,828,084 | 5/1989 | Hasagawa et al. | 192/3.29 X |
| 4,969,543 | 11/1990 | Macdonald | 192/3.29 |
| 5,054,590 | 10/1991 | Paulsen | 192/3.29 X |
| 5,060,769 | 10/1991 | Yoshimura et al. | 192/3.29 |
| 5,086,894 | 2/1992 | Iizuka et al. | 192/3.29 |
| 5,094,331 | 3/1992 | Fujimoto et al. | 192/107 R X |
| 5,145,045 | 9/1992 | Wakahara | 192/3.29 |
| 5,176,236 | 1/1993 | Ghidorzi et al. | 192/107 R |
| 5,209,330 | 5/1993 | Macdonald | 192/3.29 |
| 5,215,173 | 6/1993 | Gimmler | 192/3.3 |
| 5,335,765 | 8/1994 | Takakura et al. | 192/107 R |
| 5,417,315 | 5/1995 | Fukunaga | 192/3.29 X |
| 5,439,087 | 8/1995 | Umezawa | 192/107 R X |
| 5,460,255 | 10/1995 | Quigley | 192/107 R X |

FOREIGN PATENT DOCUMENTS

4224472  1/1994  Germany .................... 192/3.29

*Primary Examiner*—Andrea L. Pitts
*Attorney, Agent, or Firm*—Shapiro and Shapiro

[57] ABSTRACT

A torque converter having a lockup mechanism makes it possible to positively and forcibly suppress the frictional heat and others generated on the frictional surfaces of the lockup clutch and its counterpart while the lockup clutch is in operation, particularly in a slipping state. Hence, the life of the lockup clutch or that of the torque converter as a whole is prolonged. In this torque converter having the lockup mechanism, a hydraulic control mechanism is provided for maintaining the difference of pressure substantially at a constant level and changing the flow rate of a fluid to be supplied to the frictional surface of the lockup clutch in order to control the slipping state of the lockup clutch. Oil grooves are cut on the frictional member of the lockup clutch.

12 Claims, 8 Drawing Sheets

FIG. 4
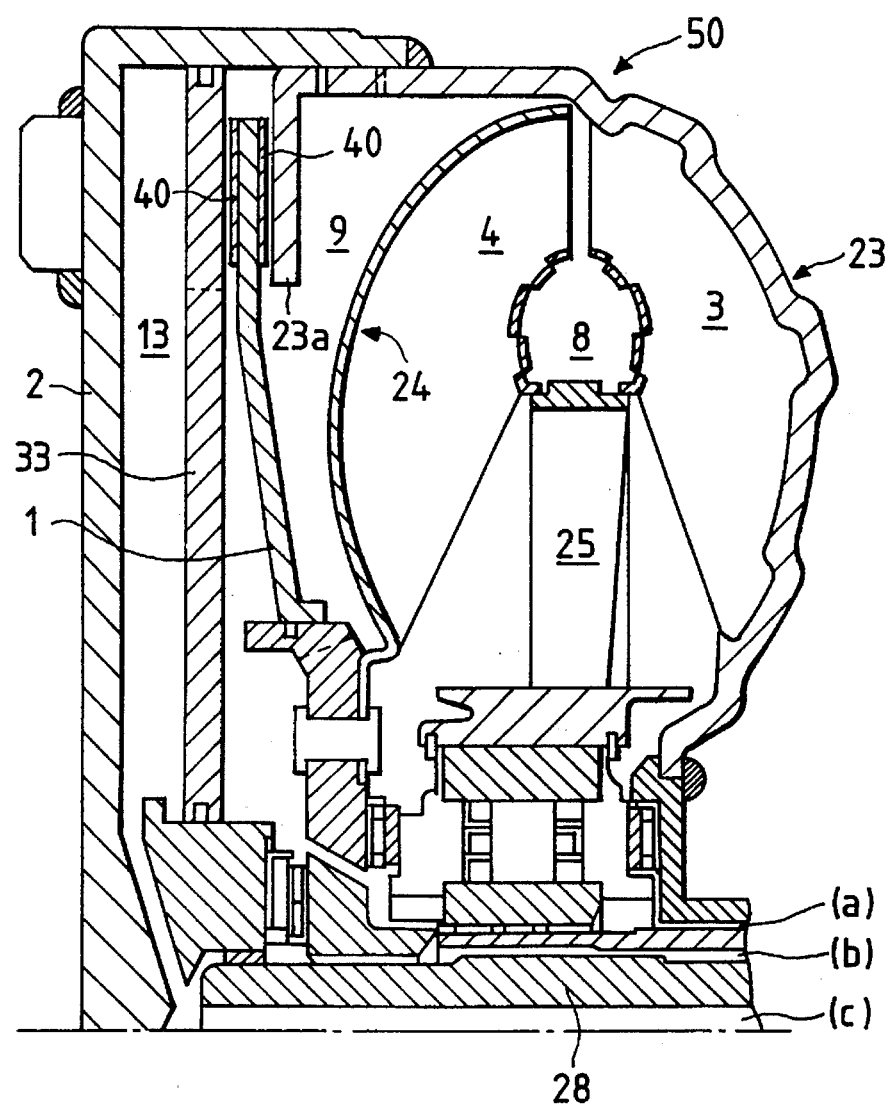
FIG. 5A
FIG. 5B
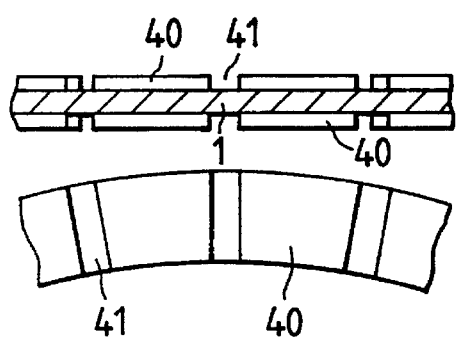

FIG. 10A
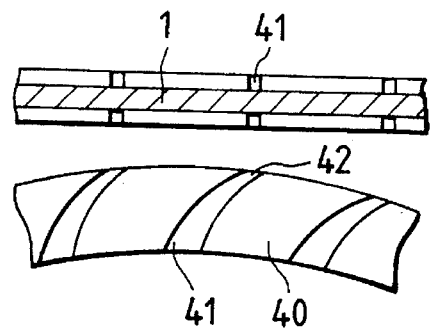
FIG. 10B
FIG. 11A
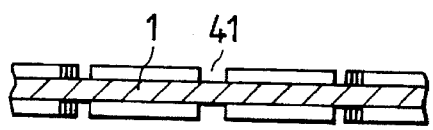
FIG. 11B
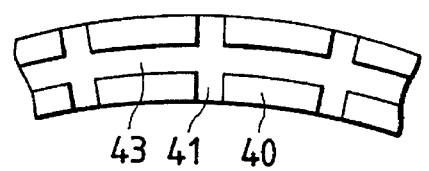
FIG. 12A
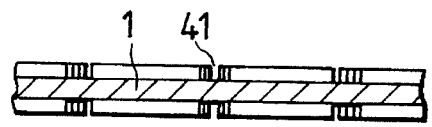
FIG. 12B
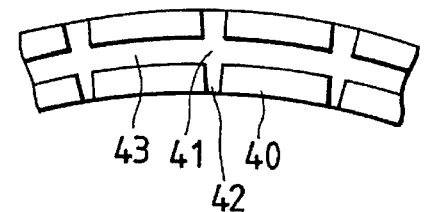
FIG. 13A
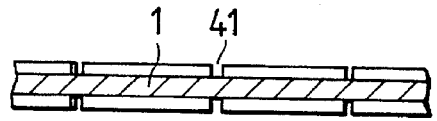
FIG. 13B
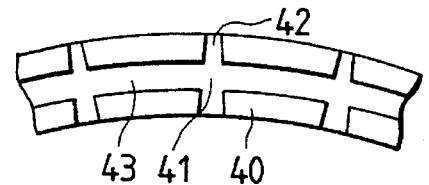

TORQUE CONVERTER WITH A LOCKUP MECHANISM

BACKGROUND OF THE INVENTION

1. Field of the Invention

This invention relates to a torque converter with a lockup mechanism for an automatic transmission for vehicles. More particularly, the invention relates to the cooling mechanism of a torque converter having a lockup mechanism in it, which is capable of cooling the frictional surface of a lockup (directly coupled) clutch, and of controlling slippage at the same time when the lockup clutch slips between its joined (or engaged) and released conditions.

2. Related Background Art

In general, with a torque converter, smooth driving can be realized since the power is transmitted through a fluid. On the other hand, it has a drawback that mileage is lowered due to the energy loss resulting from the slippage of the fluid. In order to eliminate this drawback, recent torque converters are provided with a lockup mechanism.

The lockup mechanism comprises a lockup clutch having a frictional surface. The mechanism is arranged so that the flow of a fluid in the torque converter is automatically changed when the traveling speed of a vehicle becomes higher than a predetermined speed, and then, the frictional surface of the lockup clutch is pressed to the front cover of the torque converter to directly couple the engine with the driving wheel. In this way, the lockup mechanism can eliminate the influence exerted by the fluidal slippage, hence attaining the enhancement of mileage.

The lockup clutch is displaced between the joined and released conditions like a clutch which is used with a usual manual transmission. Between the joined and released conditions of a lockup mechanism, there is provided a slipping state where the frictional surface is temporarily caused to rotate while correlatively sliding (corresponding to the half-clutched condition of a clutch used for a manual transmission) in order to utilize the friction force for softening the shock to be exerted or enhancing the transmission efficiency of the torque converter when it is in the lockup state.

In the slipping state, where the lockup clutch slides, the friction force is generated on the frictional surface and the front cover of the torque converter, thus causing excessive heat to be generated. There is a possibility of its resultant accumulation.

Usually, therefore, the torque converter having a lockup mechanism in it is provided with a cooling mechanism to remove frictional heat. For example, in the specification of U.S. Pat. No. 5,209,330, there is disclosed a torque converter having oil grooves for cooling which are open to enable a fluid to pass between a lockup clutch and the plate surface of its counterpart even when the lockup clutch is in a completely joined state. In other words, the converter is provided with a frictional member for the lockup clutch, which is not sealed (not closely in contact).

Also, in the specification of U.S. Pat. No. 5,215,173, there is disclosed a torque converter having a frictional member which is totally sealed in a state where the lockup clutch is completely joined. In this U.S. patent, it is also disclosed that this lockup clutch is cooled from the back side of the clutch piston to which the frictional member is adhesively bonded.

However, for the torque converters disclosed in the two U.S. patents described above, and also, those disclosed by the prior art, there are problems yet to be solved as described below.

In torque converters according to the prior art described above, the difference in pressure is balanced with respect to those exerted between the front cover of the torque converter and the clutch piston, and between the clutch piston and the main body of the torque converter in order to make it possible to displace the lockup clutch between its joined and released conditions. Consequently, the structure is arranged in order to make the required difference between those pressures constant for the maintenance of the slipping state of the lockup clutch in a position between its joined and released conditions.

Because of this structural arrangement, the aforesaid difference in pressure tends to vary if the flow rate of a fluid supplied to the frictional surface should be increased in order to suppress the excessive frictional heat generated particularly when the lockup clutch is in the slipping state. In other words, if the flow rate of the fluid supplied to the frictional surface should be increased or decreased, the difference in pressure is also increased or decreased almost in proportion thereto.

Then there is a possibility that the slipping state cannot be maintained. As a result, a drawback is encountered that a positive supply of the fluid is not allowable even when it is needed to suppress the frictional heat while the lockup clutch is in a slipping stat.

SUMMARY OF THE INVENTION

It is an object of the present invention to provide a torque converter with a lockup mechanism capable of cooling the frictional surface of the lockup clutch, and of controlling the slippage at the same time when the lockup clutch slips between its coupled and released conditions.

In order to solve the problems described above, a torque converter with a lockup mechanism according to the present invention is provided with a lockup mechanism having the lockup clutch which can be freely displaced between its coupled and released conditions while being able to present a slipping state between such conditions.

A feature of this torque converter with a lockup mechanism is that a hydraulic control mechanism is provided therefor to maintain substantially constant the difference in pressures required to operate the lockup clutch in order to control the slipping state, and to change, at the same time, the flow rate of the fluid to be supplied to the frictional surface of the lockup clutch.

This torque converter with a lockup mechanism is also capable of cooling the frictional surface thereof and controlling the slippage at the same time when the lockup clutch slips between its coupled and released conditions, hence making it possible to positively and forcibly suppress the frictional heat to be generated on the frictional surface when the lockup clutch slips.

BRIEF DESCRIPTION OF THE DRAWINGS

FIG. 4 is an axially sectional view which shows a torque converter having a lockup clutch of a multiple disc type according to still another embodiment of the present invention.

FIGS. 5A and 5B are top and front views, respectively, showing a part the lockup clutch having a frictional member adhesively bonded thereto and illustrating a structural example of the frictional member according to each of the above-mentioned embodiments of the present invention.

FIGS. 10A and 10B are top and front views, respectively, showing a part of the lockup clutch having a frictional member adhesively bonded thereto and illustrating a structural example of the frictional member according to each of the above-mentioned embodiments of the present invention.

FIGS. 11A and 11B are top and front views, respectively, showing a part of the lockup clutch having a frictional member adhesively bonded thereto and illustrating a structural example of the frictional member according to each of the above-mentioned embodiments of the present invention.

FIGS. 12A and 12B are top and front views, respectively, showing a part of the lockup clutch having a frictional member adhesively bonded thereto and illustrating a structural example of the frictional member according to each of the above-mentioned embodiments of the present invention.

FIGS. 13A and 13B are top and front views, respectively, showing a part of the lockup clutch having a frictional member adhesively bonded thereto and illustrating a structural example of the frictional member according to each of the above-mentioned embodiments of the present invention.

DETAILED DESCRIPTION OF THE PREFERRED EMBODIMENTS

Hereinafter, with reference to the accompanying drawings, a detailed the description will be made of the present invention. In this respect, the embodiments described hereunder are only for the illustrative explanation of the present invention, and it is needless to state that the scope of the present invention is not limited by these embodiments. Also, in each of the drawings, the same reference marks are provided for designating the same parts appearing therein.

Figure 1:
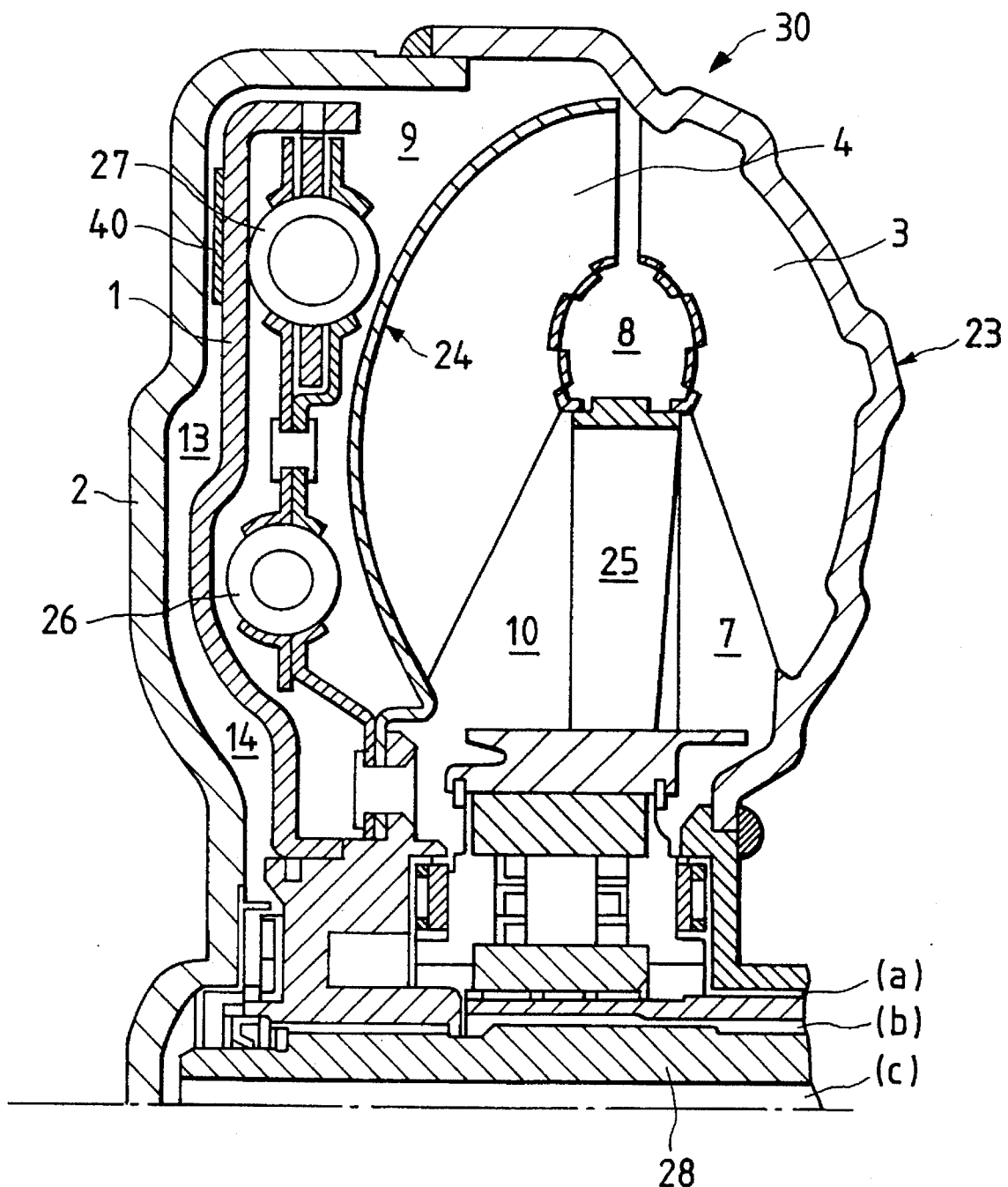
FIG. 1 is an axially sectional view which shows a torque converter with a lockup mechanism according to an embodiment of the present invention.

FIG. 1 is an axially sectional view which shows a torque converter 30 according to an embodiment of the present invention. The torque converter 30 comprises the front cover 2 which forms a part of the housing of the torque converter 30; an impeller 23 which is a doughnut-shaped vane wheel fixed to the front cover 2; a turbine 24 which is a doughnut-shaped vane wheel having blades facing the vanes of the impeller 23; and a stator 25 rotatively arranged between the impeller 23 and the turbine 24. The main body of the torque converter is formed by the impeller 23, turbine 24, and stator 25.

The impeller 23 is connected to the crank shaft of the engine of a vehicle which is not shown, and rotates together with the front cover 2 following the rotation of the engine. Also, the turbine 24 is directly connected to the output shaft 28, and connected to the wheels (not shown) through a gear-change mechanism which is not shown, either. The stator 25 is pinched by the central portions of the inner circumferences of the impeller 23 and the turbine 24, and changes the flow of the fluid which fills the torque converter 30.

Between the inner surface of the front cover 2 and the outer surface of the turbine 24, there is arranged the lockup clutch 1, an annular plate which performs a piston motion, having a frictional member 40 adhesively bonded to the surface opposite to the inner surface of the front cover 2, and being rotatable together with the output shaft 28. The frictional surface of the frictional member 40 faces the inner surface of the front cover 2. Between the outer surface of the turbine 24 and the lockup clutch 1, a damper mechanism formed by coil springs 26 and 27 is arranged to soften shock exerted when the lockup clutch 1 is engaged with the inner surface of the front cover 2. Also, in the center of the torque converter 30, a central space 8 is formed.

Now, the operation of the lockup clutch will be described. When the traveling speed of a vehicle becomes higher than a predetermined speed, a feedback control is performed by a controller which is not shown to cause the flow of a fluid to be changed automatically in the torque converter 30 formed by the impeller 23 and turbine 24. By this change, the lockup clutch 1 is pressed to the inner surface of the front cover 2, thus enabling the frictional member 40 of the lockup clutch 1 and the inner surface of the front cover 2 to be joined to assume the lockup state of the lockup clutch 1. In this way, the driving power of the engine is transmitted to the output shaft 28 directly. Then the driving and output sides are mechanically joined without any intervention of a fluid, thus making it possible to prevent any fluidal loss from being incurred, and enhance mileage.

Figure 2:
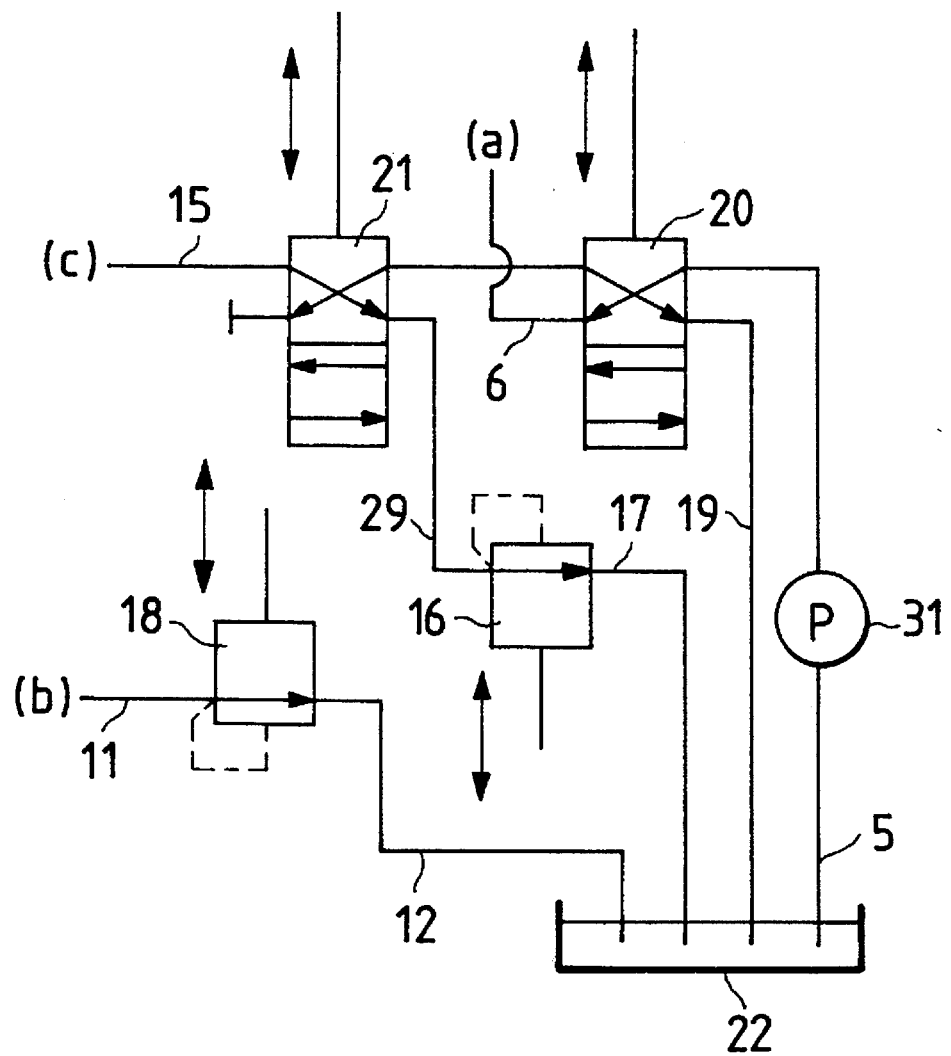
FIG. 2 is a hydraulic circuit diagram which shows schematically a hydraulic control mechanism used for each of the embodiments according to the present invention.

FIG. 2 is a hydraulic circuit diagram schematically showing the hydraulic control mechanism used for each of the embodiments according to the present invention.

The oil passages at (a), (b), and (c) in FIG. 2 are conductively connected to those indicated at (a), (b), and (c) in FIG. 1. Also, the hydraulic circuit represented in FIG. 2 indicates that the lockup clutch 1 is in a slipping state which appears between its conditions of being joined and released. Between the hydraulic circuit shown in FIG. 2 and the torque converter, two oil passages, first and second, are formed as described hereunder.

From an oil tank 22 in which a fluid, that is, a mission oil or the like, is filled, the oil is sucked up by a pump 31 through an oil passage 5 to the oil passage (a) via a magnetic valve 20 and an oil passage 6. With reference to FIG. 1, the oil which enters the torque converter 30 through the oil passage (a) is allowed to move into the space 7 formed by the stator 25 and the impeller 23, a chamber 3 formed in the impeller 23, a chamber 4 formed by the turbine 24, and a space 10 formed by the stator 25 and the turbine 24 in that order. Lastly, through the oil passage (b), it exits from the torque converter 30, and returns to the hydraulic circuit shown in FIG. 2. After that, it passes through an oil path 11 and a relief valve 18 and returns to the oil tank 22 through an oil path 12. As described above, the oil flows from the oil tank 22→oil path 5→pump 31→magnetic valve 20→oil path 6→oil passage (a)→space 7→chamber 3→chamber 4→space 10→oil passage (b)→oil path 11→relief valve 18→oil path 12→oil tank 22. This constitutes a first oil passage.

The oil also flows in a second oil passage. In other words, the oil is sucked up from the oil tank 22 by a pump 31 through an oil path 5 to the oil passage (a) via a magnetic valve 20 and an oil path 6. Here, with reference to FIG. 1, the oil which enters the torque converter 30 through the oil passage (a) is allowed to move into the space 7 formed by the stator 25 and the impeller 23, the chamber 3, and the chamber 9 formed between the turbine 24 and the lockup clutch 1 in that order. Then the oil enters the spaces 13 and 14 formed by the lockup clutch and the inner surface of the front cover 2, and lastly, through the oil passage (c), it returns from the torque converter 30 to the hydraulic circuit shown in FIG. 2. The oil passes from the oil passage (c) through an oil path 15 and through a magnetic valve 21, and flows to the relief valve 16 through an oil path 29. After that, it passes from the relief valve 16 and through an oil path 17 and returns to the oil tank 22. As described above, the oil flows from the oil tank 22→oil path 5→pump 31→magnetic valve 20→oil path 6→oil passage (a)→space 7→chamber 3→space 9→space 13→space 14→oil passage (c)→oil path 15→magnetic valve 21→oil passage 29→relief valve 16→oil path 17→oil tank 22. This constitutes the second oil passage. In this respect, according to the embodiments to be described in conjunction with FIG. 3 and FIG. 4, the oil passes through only the space 13 after the space 9.

Here, the difference in pressure between the two oil passages, first and second, having the lockup clutch 1 between them will be described. It is possible to change (that is, to increase or decrease) the flow rate of the oil for the maintenance of the slipping state of the lockup clutch 1, while keeping substantially at a constant level the difference in pressure before and after the lockup clutch 1, if the difference between the set values of pressure given to the relief valves 16 and 18 (that is, $P_{18}-P_{16}$), is increased or decreased while keeping their relationship at $P_{18}>P_{16}$, where the value of set pressure for the relief valve 18 is $P_{18}$, and that of the set pressure for the relief valve 16 is $P_{16}$.

The lockup clutch 1 can be in a state of being completely joined if the relief valve 16 and the relief valve 18 change over from the slipping state of the lockup clutch 1 represented in FIG. 2 by suspending the operation of these valves, and then, the flow of the oil is inverted when switching over the magnetic valve 20 and the magnetic valve 21. As a result, the lockup clutch 1 is in a state of being released.

In this respect, the switching over of the relief valve 16, relief valve 18, magnetic valve 20, and magnetic valve 21 is conducted by a control mechanism (not shown) on the basis of the traveling speed of a vehicle and other information.

Figure 3:
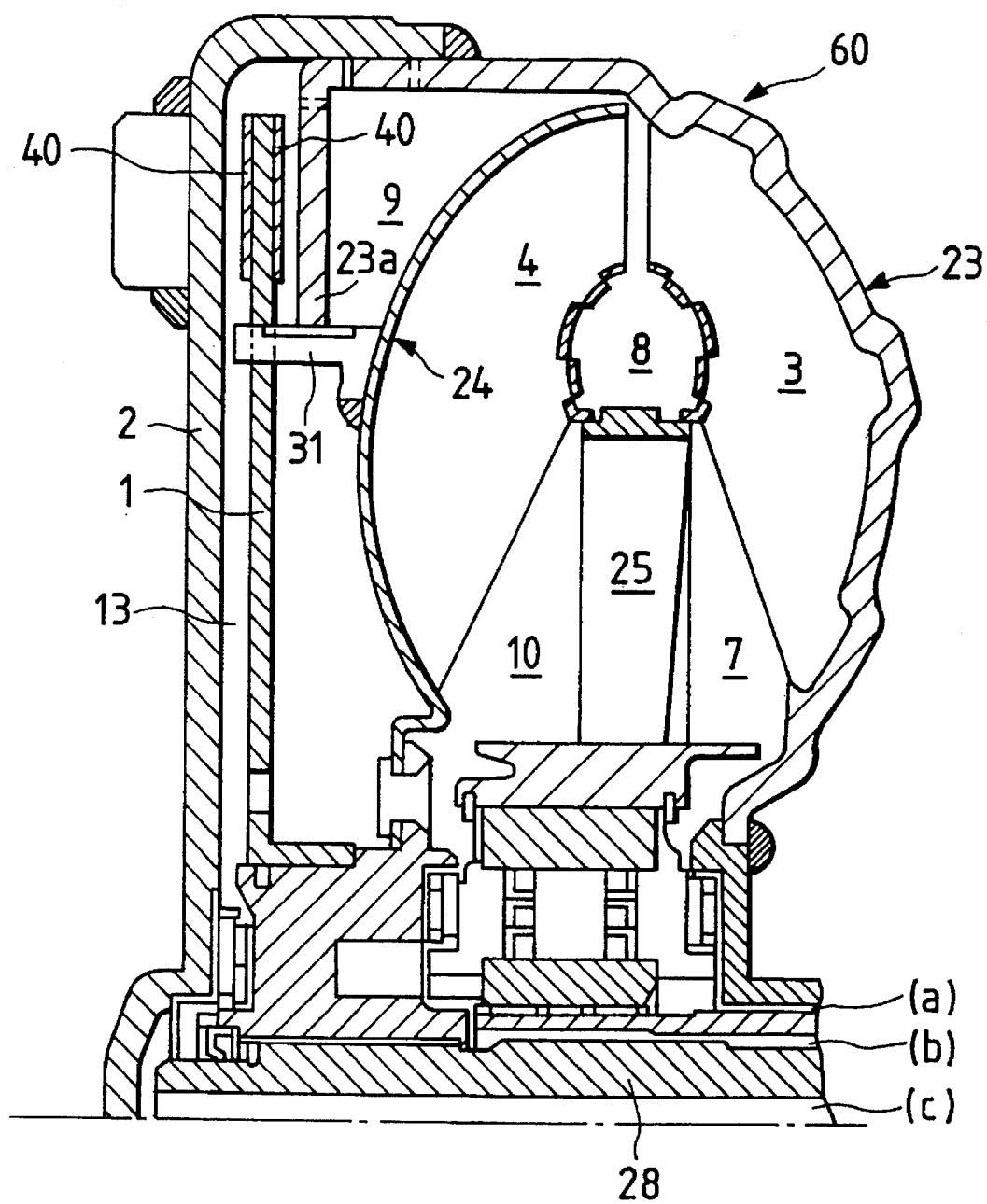
FIG. 3 is an axially sectional view which shows a torque converter having a lockup clutch of a multiple disc type according to another embodiment of the present invention.

In the embodiment described above, a torque converter having a lockup clutch of a single-disc type on which the frictional member 40 is mounted only on one surface (front cover 2 side) has been described, but it is needless to state that the present invention is applicable to torque converters 60 and 50 having a lockup clutch of a multiple disc type as shown in FIG. 3 and FIG. 4, respectively.

The constituents shown in FIG. 3 and FIG. 4 are almost the same as those shown in FIG. 1 in their fundamental arrangements. Therefore, only those parts which differ from each other, that is, the portions related to the lockup clutch, will be described.

According to an embodiment represented in FIG. 3, the lockup clutch 1 has the frictional member 40 adhesively bonded to its surface on both sides. The lockup clutch 1 is arranged to slidably engage in the axial direction with a member 31 fixed to the turbine 24. Therefore, in the case shown in FIG. 3, the lockup clutch 1 slides in the axial direction in accordance with the difference in pressure between the space 9 and space 13 to be in a state of being joined when the frictional member 40 is pressed to the inner surface of the front cover 2, or when the frictional member 40 is pressed to the outer surface of a flange 23a which is integral with and extends from the impeller 23. In this respect, FIG. 3 illustrates the lockup clutch 1 which is in a released state. Also, the lockup clutch 1 can assume a slipping state in accordance with the difference in pressure.

According to an embodiment represented in FIG. 4, the lockup clutch 1 having the frictional member 40 adhesively bonded to its surface on both sides is arranged to be pinched by the outer surface of a flange 23a, which is integral with and extends from the impeller 23, and a pressure plate 33 which is slidable in the axial direction.

Therefore, in accordance with the difference in pressure between the space 9 and space 13, the lockup clutch 1 is in a state of being joined when pinched between the flange 23a and the pressure plate 33, which has been caused to slide. In this respect, FIG. 4 illustrates the lockup clutch 1 in a released state. Also, the lockup clutch 1 can assume a slipping state in accordance with the difference in pressure.

With respect to the torque converters 60 and 50 having the lockup clutch 1 of a multiple disc type shown in FIG. 3 and FIG. 4, the oil passages (a), (b), and (c) around the output shaft 28 are connected to those at (a), (b), and (c) in FIG. 2, respectively, as in the torque converter 30 represented in FIG. 1. Therefore, these converters are given control with respect to its slipping state by means of the hydraulic circuit shown in FIG. 2 in the same manner as described in conjunction with FIG. 1.

In each of the embodiments described above, the oil grooves are formed on the frictional surface in order to allow the fluid, or the oil, in the torque converters 30, 60, and 50 to flow between the frictional member 40 of the lockup clutch 1 and the frictional surface opposite thereto, thus cooling the frictional heat generated on the frictional surface, and also, enabling the fluid to flow smoothly in each of joined or released states of the lockup clutch 1.

With the various oil grooves configurations on the frictional member, an oil film is formed uniformly over the frictional surface of the lockup clutch while it rotates, thus providing a lubricating function. As a result, the smooth sliding of the lockup clutch is attained. Also, in this way, it is possible to obtain an effect to suppress the judder of the lockup clutch.

Hereinafter, with reference to FIG. 5A to FIG. 16C, each example of the above-mentioned oil grooves will be described. In this respect, while the examples are shown in FIG. 5A to FIG. 16C with respect to a lockup clutch 1 having a frictional member adhesively bonded on its surface on both sides, it is needless to state that the same oil grooves can be provided for a lockup clutch having a frictional member bonded on only one side.

FIG. 5A and FIG. 5B are top and front views, respectively, showing a part of lockup annular clutch 1 having a frictional member 40 fixed by adhesive bonding or other means to its surface on both sides in the axial direction of the annular unit. On each frictional member 40 on both surfaces, almost linearly formed oil grooves 41 are radially cut to extend in the radial direction, each substantially having the same width. Therefore, oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

Figure 6A:
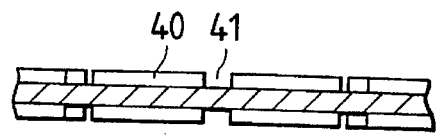
FIGS. 6A and 6B are top and front views, respectively, showing a part of the lockup clutch having a frictional member adhesively bonded thereto and illustrating a structural example of the frictional member according to each of the above-mentioned embodiments of the present invention.
Figure 6B:
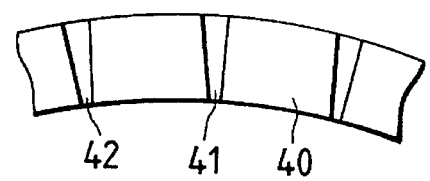

FIG. 6A and FIG. 6B are top and front views, respectively, showing a part of lockup annular clutch 1 having a frictional member 40 fixed by adhesive bonding or other means to its surface on both sides in the axial direction of the annular unit. On each frictional member 40 on both surfaces, tapered oil grooves 41 are radially cut to extend in the radial direction, each having a portion 42 whose width is narrowed inwardly in the radial direction. Thus oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

Figures 7A, 7B:
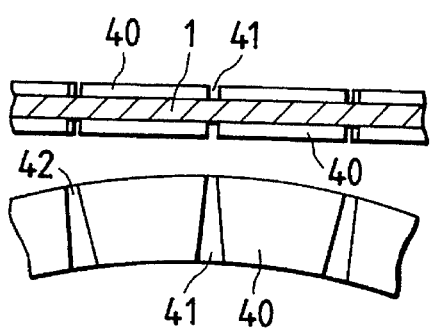
FIGS. 7A and 7B are top and front views, respectively, showing a part of lockup clutch having a frictional member adhesively bonded thereto and illustrating a structural example of the frictional member according to each of the above-mentioned embodiments of the present invention.

FIG. 7A and FIG. 7B are top and front views, respectively, showing a part of lockup annular clutch 1 having a frictional member 40 fixed by adhesive bonding or other means to its surface on both sides in the axial direction of the annular unit. On each frictional member 40 on both surfaces, tapered oil grooves 41 are radially cut to extend in the radial direction, each having a portion 42 whose width is narrowed outwardly in the radial direction, which is contrary to the example represented in FIGS. 6A and 6B. The oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

Figure 8A:
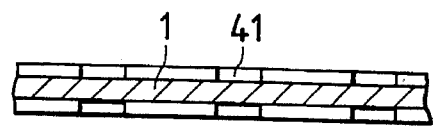
FIGS. 8A and 8B are top and front views, respectively, showing a part of the lockup clutch having a frictional member adhesively bonded thereto and illustrating of a structural example of the frictional member according to each of the above-mentioned embodiments of the present invention.
Figure 8B:
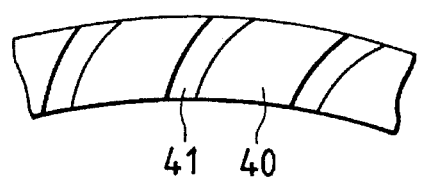

FIG. 8A and FIG. 8B are top and front views, respectively, showing a part of lockup annular clutch 1 having a frictional member 40 fixed by adhesive bonding or other means to its surface on both sides in the axial direction of the annular unit. On each frictional member 40 on both surfaces, oil grooves 41 are radially cut to extend in the radial direction at a predetermined angle to the radius, each having substantially the same width at the same time. Thus the oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

Figure 9A:
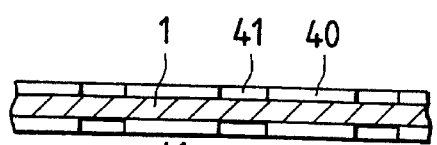
FIGS. 9A and 9B are top and front views, respectively, showing a part of the lockup clutch having a frictional member adhesively bonded thereto and illustrating a structural example of the frictional member according to each of the above-mentioned embodiments of the present invention.
Figure 9B:
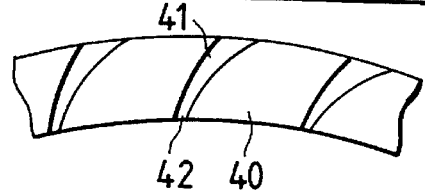

FIG. 9A and FIG. 9B are top and front views, respectively, showing a part of lockup annular clutch 1 having a frictional member 40 fixed by adhesive bonding or other means to its surface on both sides in the axial direction of the annular unit. On each frictional member 40 on both surfaces, tapered oil grooves 41 are radially cut to extend in the radial direction at a predetermined angle to the radius, each having a portion 42 where the width is narrowed inwardly in the radial direction at the same time. Thus the oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

FIG. 10A and FIG. 10B are top and front views, respectively, showing a part of lockup annular clutch 1 having a frictional member 40 fixed by adhesive bonding or other means to its surface on both sides in the axial direction of the annular unit. On each frictional member 40 on both surfaces, tapered oil grooves 41 are radially cut to extend in the radial direction at a predetermined angle to the radius, each having a portion 42 where the width is narrowed outwardly in the radial direction at the same time, which is contrary to the example shown in FIG. 9A and FIG. 9B. The oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

FIG. 11A and FIG. 11B are top and front views, respectively, showing a part of lockup annular clutch 1 having a frictional member 40 fixed by adhesive bonding or other means to its surface on both sides in the axial direction of the annular unit. On each frictional member 40 on both surfaces, almost linearly formed oil grooves 41 are radially cut to extend in the radial direction, each having substantially the same width at the same time. Also, intersecting the oil grooves 41 substantially at right angles and substantially in the center of the annular unit of the lockup clutch 1 in the radial direction, an oil groove 43 is cut to extend over the circumference in its entire direction on each surface. The width of the oil groove 43 in the radial direction is almost constant over the entire circumference. Thus the oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

FIG. 12A and FIG. 12B are top and front views, respectively, showing a part of lockup annular clutch 1 having a frictional member 40 fixed by adhesive bonding or other means to its surface on both sides in the axial direction of the annular unit. On each frictional member 40 on both surfaces, tapered oil grooves 41 are radially cut to extend in the radial direction, each having a portion 42 where the width is narrowed inwardly in the radial direction. Also, intersecting the oil grooves 41 substantially at right angles and substantially in the center of the annular unit of the lockup clutch 1 in the radial direction, an oil groove 43 is cut to extend over the circumference in its entire direction on each surface. The width of the oil groove 43 in the radial direction is almost constant over the entire circumference. Thus the oil flows along the oil grooves 41 even when the lockup clutch 1 is in a coupled state or in the slipping state. The plural oil grooves 41 of the same configuration, which are divided equally in the circumferential direction, extend to both edges in the radial direction of the annular unit of the lockup clutch 1.

FIG. 13A and FIG. 13B are top and front views, respectively, showing a part of lockup annular clutch 1 having a frictional member 40 fixed by adhesive bonding or other means to its surface on both sides in the axial direction of the annular unit. On each frictional member 40 on both surfaces, tapered oil grooves 41 are radially cut to extend in the radial direction, each having a portion 42 where the width is narrowed outwardly in the radial direction, which is contrary to the example shown in FIG. 12A and FIG. 12B. Also, intersecting the oil grooves 41 substantially at right angles and substantially in the center of the annular unit of the lockup clutch 1 in the radial direction, an oil groove 43 is cut to extend over the entire circumference on each surface. Thus the oil flows along the oil grooves 41 even when the lockup clutch 1 is in a coupled state or in the slipping state. The plural oil grooves 41 of the same configuration, which are divided equally in the circumferential direction extend to both edges in the radial direction of the annular unit of the lockup clutch 1.

As shown in FIGS. 11A and 11B, FIGS. 12A and 12B, and FIGS. 13A and 13B, it becomes easier to form the oil film on the frictional surface by providing the oil groove 43 which extends over the entire circumference.

In each of the examples shown in FIG. 5A to FIG. 13B, the circumferential phase of the oil grooves 41 provided for the frictional member 40 is identical on both surfaces of the lockup clutch 1.

Now, the examples in which the phase of the oil grooves 41 is different in the circumferential direction will be shown in FIG. 14A to FIG. 16C.

Figure 14A:
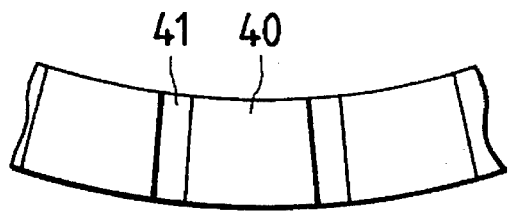
FIGS. 14A, 14B, and 14C are partial views showing respectively the front, top, and reverse sides of a lockup clutch having a frictional member adhesively bonded thereto and illustrating a structural example of the frictional member according to each of the above-mentioned embodiments of the present invention.
Figure 14B:
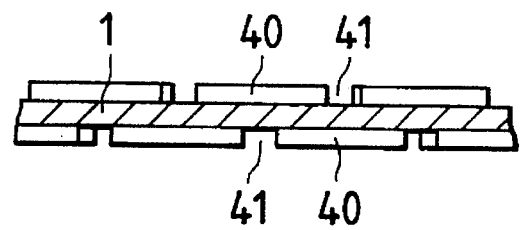
Figure 14C:
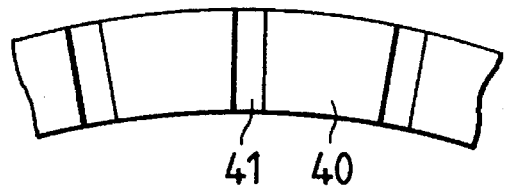

FIGS. 14A, 14B, and 14C are front, top, and back views, respectively, showing a part of the lockup clutch 1 having the frictional member adhesively bonded thereto for the illustration of the structural example of the frictional member according to each of the above-mentioned embodiments of the present invention. Since the same oil grooves 41 as those shown in FIGS. 5A and 5B are provided for the frictional member 40, the description of the corresponding parts will be omitted, but the oil grooves 41 are arranged on both surfaces of the lockup clutch 1 by changing their circumferential phases. In other words, the oil grooves 41 are arranged to make this phases inverted relative to each other on the front and back sides of the lockup clutch 1.

Figure 15A:
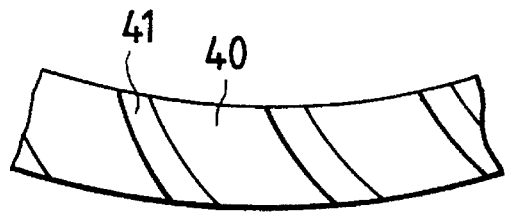
FIGS. 15A, 15B, and 15C are partial views showing respectively the front, top, and reverse sides of a lockup clutch having a frictional member adhesively bonded thereto and illustrating a structural example of the frictional member according to each of the above-mentioned embodiments of the present invention.
Figure 15B:
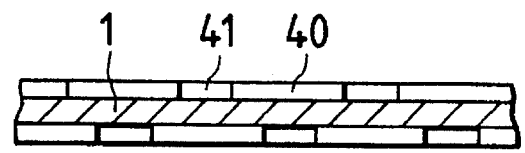
Figure 15C:
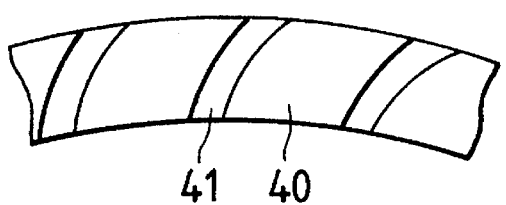

FIGS. 15A, 15B, and 15C are front, top, and back views, respectively, showing a part of the lockup clutch 1 having the frictional member adhesively bonded thereto for the illustration of the structural example of the frictional member according to each of the above-mentioned embodiments of the present invention. Since the same oil grooves 41 as those shown in FIGS. 8A and 8B are provided for the frictional member 40, the description of the corresponding parts will be omitted, but the oil grooves 41 are arranged on both surfaces of the lockup clutch 1 by changing their circumferential phases. In other words, the oil grooves 41 are arranged to make their phases inverted relative to each other on the front and back sides of the lockup clutch 1.

Figure 16A:
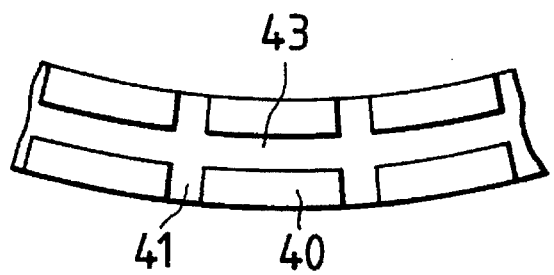
FIGS. 16A, 16B, and 16C are partial views showing respectively the front, top, and reverse sides of a lockup clutch having a frictional member adhesively bonded thereto and illustrating a structural example of the frictional member according to each of the above-mentioned embodiments of the present invention.
Figure 16B:
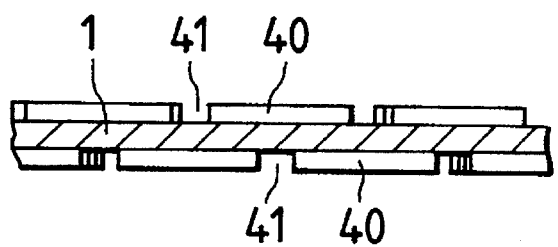
Figure 16C:
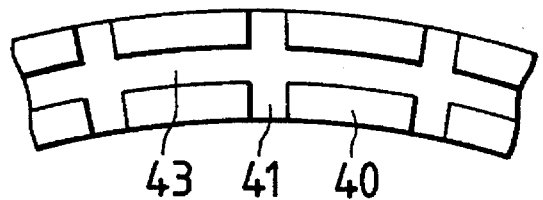

FIGS. 16A, 16B, and 16C are front, top, and back views, respectively, showing a part of the lockup clutch 1 having the frictional member adhesively bonded thereto for the illustration of the structural example of the frictional member according to each of the above-mentioned embodiments of the present invention. Since the same oil grooves 41 as those shown in FIGS. 11A and 11B are provided for the frictional member 40, the description of the corresponding parts will be omitted, but the oil grooves 41 in the radial direction are arranged on both surfaces of the lockup clutch 1 by changing their circumferential phases. In other words, the oil grooves 41 which extend in the radial direction are arranged to make their phases inverted relative to each other on the front and back sides of the lockup clutch 1.

In accordance with the oil grooves 41 and 43 described above, a given rate of oil passes the frictional surface even when the lockup clutch 1 is in a joined state, hence making it convenient to cool the frictional surface. Also, the depth of the oil grooves 41 or 43, that is, the thickness thereof, extends to the surface of the lockup clutch 1 in the embodiments described above. However, the depth is not necessarily arranged in such a manner. For example, it may be possible to cut the oil grooves to a given depth which does not reach the surface of the lockup clutch 1.

In this respect, it is of course possible to make the phases of the oil grooves 41 inverted on the front and back sides of the lockup clutch 1 in such a manner that the examples shown in FIGS. 6A and 6B, FIGS. 7A and 7B, FIGS. 9A and 9B, FIGS. 10A and 10B, FIGS. 12A and 12B, and FIGS. 13A and 13B are arranged as indicated in FIGS. 14A to 14C, FIGS. 15A to 15C, and FIGS. 16A to 16C.

In accordance with a torque converter having a lockup mechanism of the present invention as described above, it is possible to obtain the effects given below.

In order to control the slipping state of a lockup clutch, the difference in pressure is maintained substantially at a constant level for operating the lockup clutch, and a hydraulic control mechanism is arranged at the same time to change the flow rate of a fluid supplied to the frictional surface of the lockup clutch. In this way, it is possible to positively and forcibly suppress the frictional heat and others generated on the frictional surface of the lockup clutch and its counterpart when it is in operation, particularly when the lockup clutch is in a slipping state. As a result, the life of the lockup clutch or that of a torque converter as a whole can be prolonged.

Also, in accordance with the embodiments, an oil film can be formed uniformly over the frictional surface of the lockup clutch while it is in rotation by means of the oil grooves which are provided in various configurations. By the lubricating function thus obtained, it is possible to attain the smooth sliding of the lockup clutch. Therefore, it is also possible to effectively suppress the self-excited oscillation (judder) of the lockup clutch.

What is claimed is:

1. A torque converter with a main body that transmits power through a fluid, and a lockup mechanism, said lockup mechanism having a lockup clutch capable of being displaced between engaged and released conditions and assuming a slipping state between said engaged and released conditions, said torque converter comprising:

a first fluid space that receives fluid to bias said lockup clutch toward said engaged condition;

a second fluid space in fluid communication with said first fluid space within said main body and that receives fluid to bias said lockup clutch toward said released condition; and a hydraulic control mechanism in fluid communication with said first and second fluid spaces and that changes a flow rate of fluid supplied to a frictional surface on said lockup clutch while maintaining substantially constant a fluid pressure difference between said first and second fluid spaces in order to control said slipping state.

2. A torque converter according to claim 1, wherein the frictional surface of said lockup clutch is formed by a frictional member adhesively bonded to said lockup clutch.

3. A torque converter according to claim 2, wherein the frictional member of said lockup clutch is disposed on one axial end surface of said lockup clutch.

4. A torque converter according to claim 2, wherein the frictional member of said lockup clutch is disposed on opposite axial end surfaces of said lockup clutch.

5. A torque converter according to claim 3, wherein said frictional member has oil grooves extending in a radial direction.

6. A torque converter according to claim 4, wherein said frictional member has oil grooves extending in a radial direction.

7. A torque converter according to claim 6, wherein said oil grooves extending in the radial direction are equidistantly spaced in a circumferential direction on each said surface of said lockup clutch, and arranged in phase on said surfaces of said lockup clutch.

8. A torque converter according to claim 6, wherein said oil grooves extending in the radial direction are equidistantly spaced in a circumferential direction on each said surface of said lockup clutch, and arranged with inverted phases on said surfaces of said lockup clutch.

9. A torque converter according to claim 7, wherein said oil grooves extending in the radial direction each have a tapered configuration with a width that becomes smaller in a radially inward direction of said lockup clutch.

10. A torque converter according to claim 8, wherein said oil grooves extending in the radial direction each have a tapered configuration with a width that becomes smaller in a radially inward direction of said lockup clutch.

11. A torque converter according to claim 5, wherein said frictional member has an oil groove extending in the circumferential direction of said lockup clutch and intersecting said oil grooves extending in the radial direction.

12. A torque converter according to claim 1, wherein said hydraulic control mechanism comprises a first relief valve and a second relief valve in fluid communication with said first fluid space and said second fluid space, respectively, for controlling said fluid pressure difference between said first and second fluid spaces.

* * * * *